(12) United States Patent
Liang et al.

(10) Patent No.: US 7,548,384 B1
(45) Date of Patent: Jun. 16, 2009

(54) LENS SYSTEM WITH SMALL EMERGENCE ANGLE

(75) Inventors: Kuo-Yen Liang, Taipei Hsien (TW); Chun-Hsiang Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/166,339

(22) Filed: Jul. 2, 2008

(30) Foreign Application Priority Data

Apr. 24, 2008 (CN) .......................... 2008 1 0301288

(51) Int. Cl.
*G02B 9/34* (2006.01)
(52) U.S. Cl. .......................... 359/773; 359/772; 359/771
(58) Field of Classification Search .................. 359/773, 359/772, 771, 766, 764, 753
See application file for complete search history.

(56) References Cited

U.S. PATENT DOCUMENTS 5,808,815 A 9/1998 Kouthoofd
2007/0242370 A1* 10/2007 Fukuta et al. ............... 359/773

* cited by examiner

*Primary Examiner*—Timothy J Thompson
(74) *Attorney, Agent, or Firm*—Zhigang Ma

(57) ABSTRACT

A lens system includes a positive refractive power first lens, a negative refractive power second lens, a positive refractive power third lens, and a negative refractive power fourth lens in that order from the object side of the lens system. Wherein the lens system satisfies the following conditions: (1) $D1/D2<1.6$; and (2) $R2/F1>1.8$, wherein, $D1$ is the effective radius of a surface of the third lens facing the image side of the lens system, $D2$ is a distance from the top point of a surface to the optical center of the third lens, $R2$ is the radius of curvature of a surface of the first lens facing the image side of the lens system, and $F1$ is a focal length of the first lens.

8 Claims, 7 Drawing Sheets

LENS SYSTEM WITH SMALL EMERGENCE ANGLE

FIELD OF THE INVENTION

The present invention relates to a lens system and, particularly to a lens system having a small light emergence angle.

DESCRIPTION OF THE RELATED ART

With the development of optical imaging technology, lens systems are becoming widely used in electronic devices, such as digital cameras, mobile phones, and so on. In order to miniaturize the electronic devices, the electronic image sensing chips used with the lens systems should be small. As a result, the lens systems need to not only have a relative good optical performance but also have a small light emergence angle to accommodate the size of the electronic image sensing chips.

What is needed, therefore, is a lens system with a small light emergence angle and with a relative good optical performance.

SUMMARY

In accordance with one present embodiment, a lens system includes a positive refractive power first lens, a negative refractive power second lens, a positive refractive power third lens, and a negative refractive power fourth lens in that order from the object side of the lens system. Wherein the lens system satisfies the following conditions:

$$D1/D2 < 1.6; \text{ and} \quad (1)$$

$$R2/F1 > 1.8, \quad (2)$$

wherein, D1 is the effective radius of a surface of the third lens facing the image side of the lens system, D2 is a distance from the top point of a surface to the optical center of the third lens, R2 is the radius of curvature of a surface of the first lens facing the image side of the lens system, and F1 is a focal length of the first lens.

BRIEF DESCRIPTION OF THE DRAWINGS

Many aspects of the present lens system can be better understood with reference to the accompanying drawings. The components in the drawing are not necessarily drawn to scale, the emphasis instead being placed upon clearly illustrating the principles of the present lens system. Moreover, in the drawings, like reference numerals designate corresponding parts throughout the several views.

DETAILED DESCRIPTION

Embodiments will now be described in detail below, with reference to the drawings.

Figure 1:
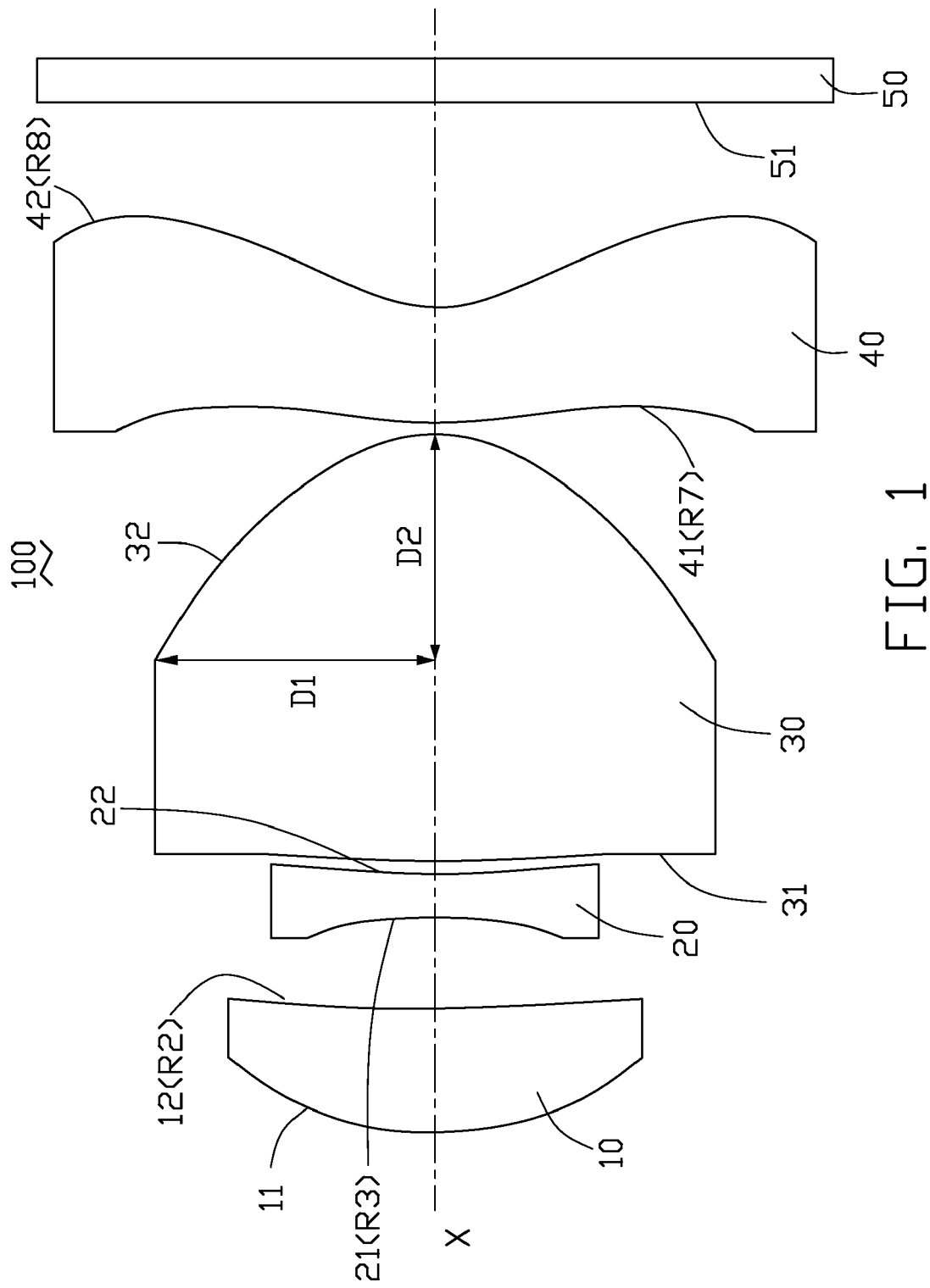
FIG. 1 is a schematic view of a lens system in accordance with an exemplary embodiment.

Referring to FIG. 1, a lens system 100, according to an embodiment, is shown. The lens system 100 includes a positive refractive power first lens 10, a negative refractive power second lens 20, a positive refractive power third lens 30, and a negative refractive power fourth lens 40 in that order from the object side of the lens system 100. The lens system 100 can be used in digital cameras, mobile phones, personal computer cameras, and so on. The lens system 100 can be used for capturing images by disposing an image sensor at an image plane 50 of the lens system 100.

In the present embodiment, the first lens 10 is a meniscus-shaped lens with a convex surface 11 facing the object side of the lens system 100 and a concave surface 12 facing the image side of the lens system 100. The second lens 20 is a biconcave-shaped lens with a concave surface 21 and a concave surface 22 facing the object side and the image side of the lens system 100 respectively. The third lens 30 is a biconvex-shaped lens with a convex surface 31 and a convex surface 32 facing the object side and the image side of the lens system 100 respectively. The fourth lens 40 is a meniscus-shaped lens with a convex surface 41 facing the object side of the lens system 100 and a concave surface 42 facing the image side of the lens system 100. Preferably, each surface of the first lens 10, the second lens 20, the third lens 30, and the fourth lens 40 is aspherical.

Further, the first lens 10, the second lens 20, the third lens 30, and the fourth lens 40 can be made of resin or plastic, which makes their manufacture relatively easy and inexpensive.

In order that the lens system 100 has a small light emergence angle and excellent optical performance, the lens system 100 satisfies the following conditions:

$$D1/D2 < 1.6; \text{ and} \quad (1)$$

$$R2/F1 > 1.8, \quad (2)$$

wherein, D1 is the effective radius of the surface 32 of the third lens 30 facing the image side of the lens system 100, D2 is a distance from the top point of the surface 32 to the optical center of the third lens 30, R2 is the radius of curvature of the surface 12 of the first lens 10 facing the image side of the lens system 100, and F1 is a focal length of the first lens 10. The first condition (1) is for limiting the shape of the surface 32 of the third lens 30 in order to reduce the light emergence angle of the lens system 100. The second condition (2) is for limiting the first lens 10 in order to improve the optical performance of the lens system 100.

Preferably, the lens system 100 also satisfies the following conditions:

$$R3 < 0; \quad (3)$$

$$R7 > R8; \text{ and} \quad (2)$$

$$R7/F > 0.5, \quad (3)$$

wherein, R3 is the radius of curvature of the surface 21 of the second lens 20 facing the object side of the lens system 100, R7 is the radius of curvature of the surface 41 of the fourth lens 40 facing the object side of the lens system 100, R8 is the radius of curvature of the surface 42 of the fourth lens 40 facing the image side of the lens system 100, and F is the focal length of the lens system 100. Conditions (3), (4), and (5) are for correcting many types of aberrations, such as spherical aberration, field curvature, and distortion, of the lens system 100.

Also, in order to appropriately correct the chromatic aberration of the lens system 100, the Abbe constant V1 of the first lens 10 and V2 of the second lens 20 preferably satisfies the following conditions:

$$V1 > 50; \text{ and} \quad (6)$$

$$V2 < 32. \quad (7)$$

Examples of the lens system 100 will be described below with reference to FIGS. 2 through 7. It is to be understood that the invention is not limited to these examples. The following are symbols used in each exemplary embodiment.

R: radius of curvature

D: distance between surfaces on the optical axis of the system nd: refractive index of lens V: Abbe constant In each example, both surfaces of the first lens 10, both surfaces of the second lens 20, both surfaces of the third lens 30, and both surfaces of the fourth lens 40 are aspheric. The shape of each aspheric surface is determined by expression 1 below. Expression 1 is based on a Cartesian coordinate system, with the vertex of the surface being the origin, and the optical axis extending from the vertex being the x-axis.

Expression 1:

$$x = \frac{ch^2}{1 + \sqrt{1 - (k+1)c^2h^2}} + \sum A_i h^i$$

wherein, h is a height from the optical axis to the surface, c is a vertex curvature, k is a conic constant, and Ai are i-th order correction coefficients of the aspheric surfaces.

EXAMPLE 1

Tables 1 and 2 show lens data of Example 1. In the table 2, A4 to A12 are aspherical coefficients.

TABLE 1

| Surface symbol | R (mm) | D (mm) | nd | V |
|---|---|---|---|---|
| 11 | 2.80 | 0.91 | 1.53 | 56 |
| 12 | 87.21 | 0.58 | | |
| 21 | −3.99 | 0.30 | 1.63 | 24 |
| 22 | 7.54 | 0.10 | | |
| 31 | 7.93 | 2.96 | 1.53 | 56 |
| 32 | −1.04 | 0.05 | | |
| 41 | 3.94 | 0.77 | 1.59 | 30 |
| 42 | 0.99 | 1.57 | | |

TABLE 2

| Surface symbol | 11 | 12 | 21 | 22 | 31 | 32 | 41 | 42 |
|---|---|---|---|---|---|---|---|---|
| A4 | 0.0076 | 0.0186 | 0.0040 | −0.0137 | −0.0376 | −0.0667 | −0.0510 | −0.0167 |
| A6 | 0.0060 | −0.0065 | −0.0596 | −0.0544 | −0.0282 | 0.0221 | 0.0122 | 0.0015 |
| A8 | −0.0045 | 0.0030 | 0.0633 | 0.0670 | 0.0336 | −0.0068 | −0.0032 | −0.0002 |
| A10 | 0.0034 | −0.0074 | −0.0553 | −0.0325 | −0.0070 | 0.0011 | 0.0005 | 1.5E-05 |
| A12 | −0.0010 | 0.0025 | 0.0093 | 0.0053 | −0.0007 | −6.8E-05 | −3.7E-07 | −9.8E-07 |

Figure 2:
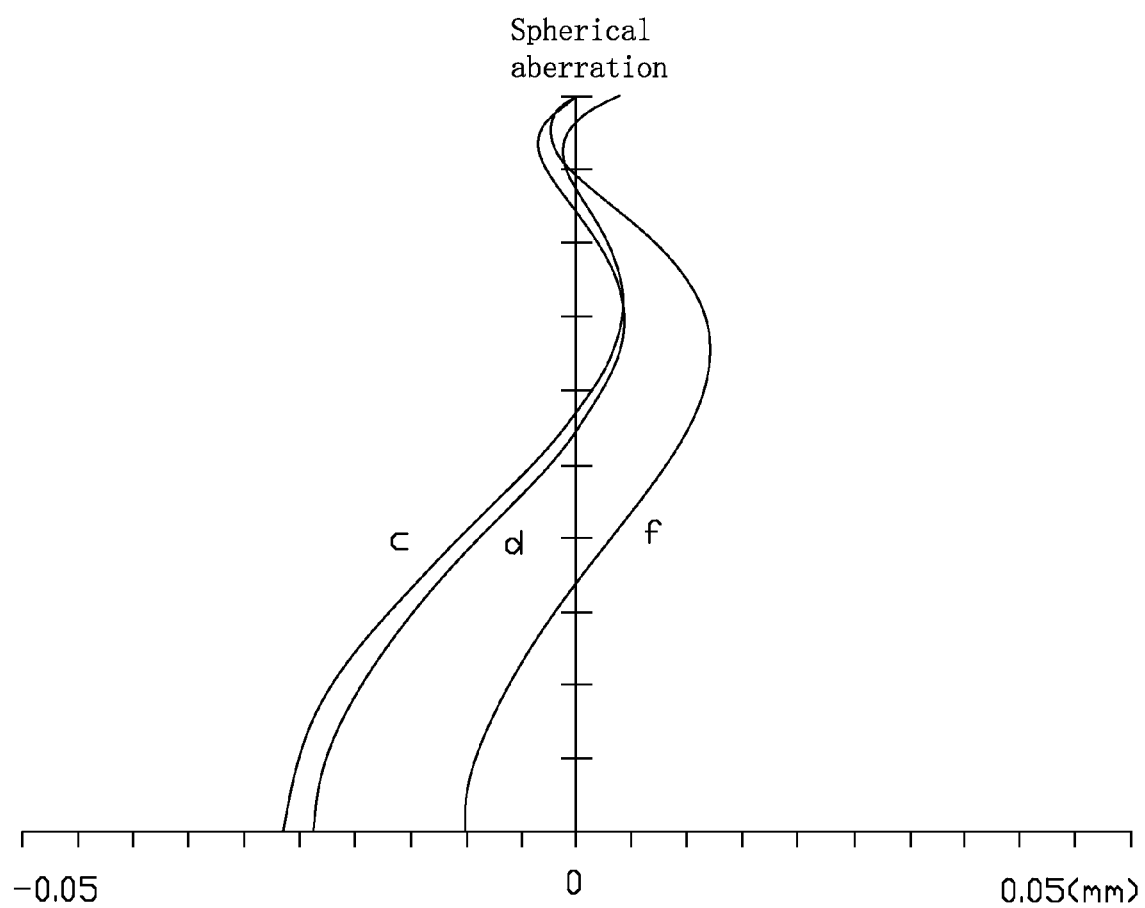
FIGS. 2 through 4 are graphs respectively showing spherical aberration, field curvature, and distortion for a lens system in accordance with a first exemplary embodiment of the present invention.
Figure 3:
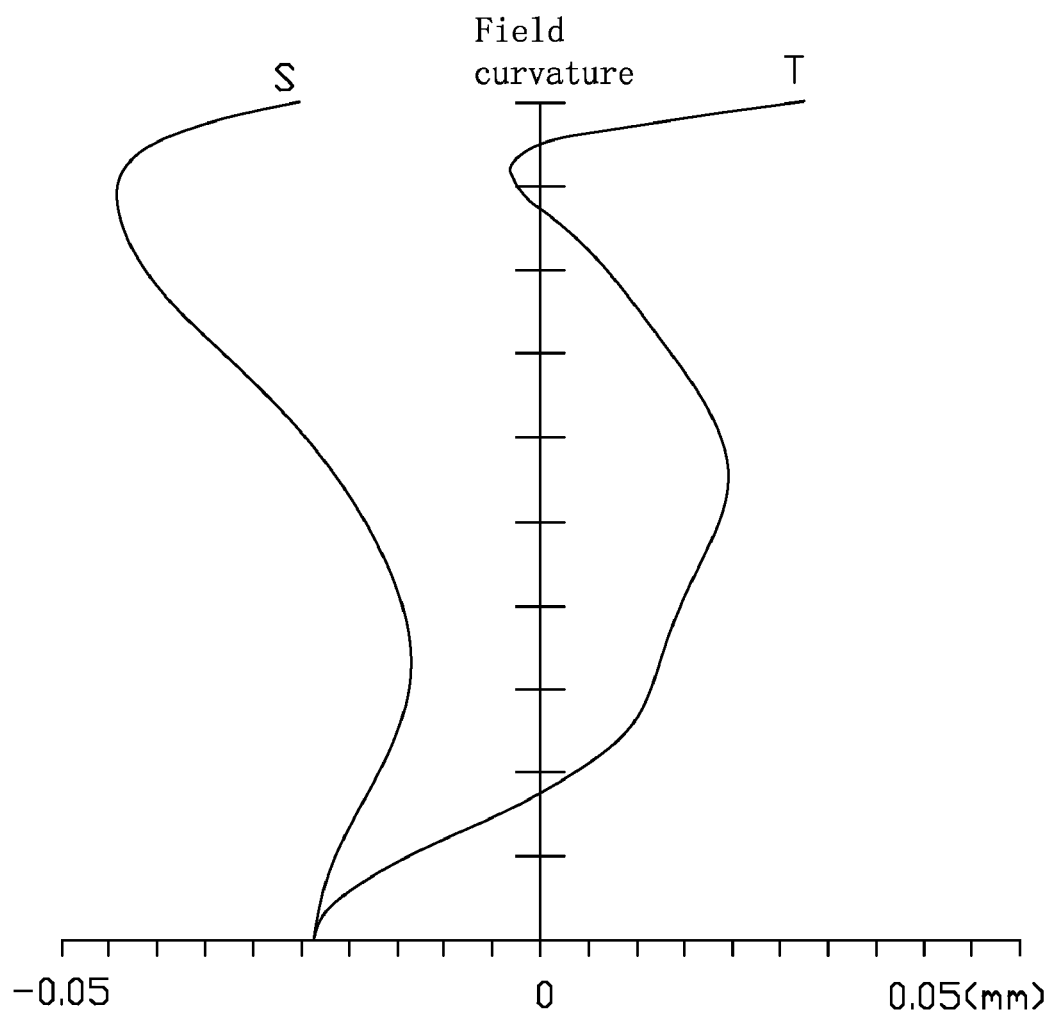
Figure 4:
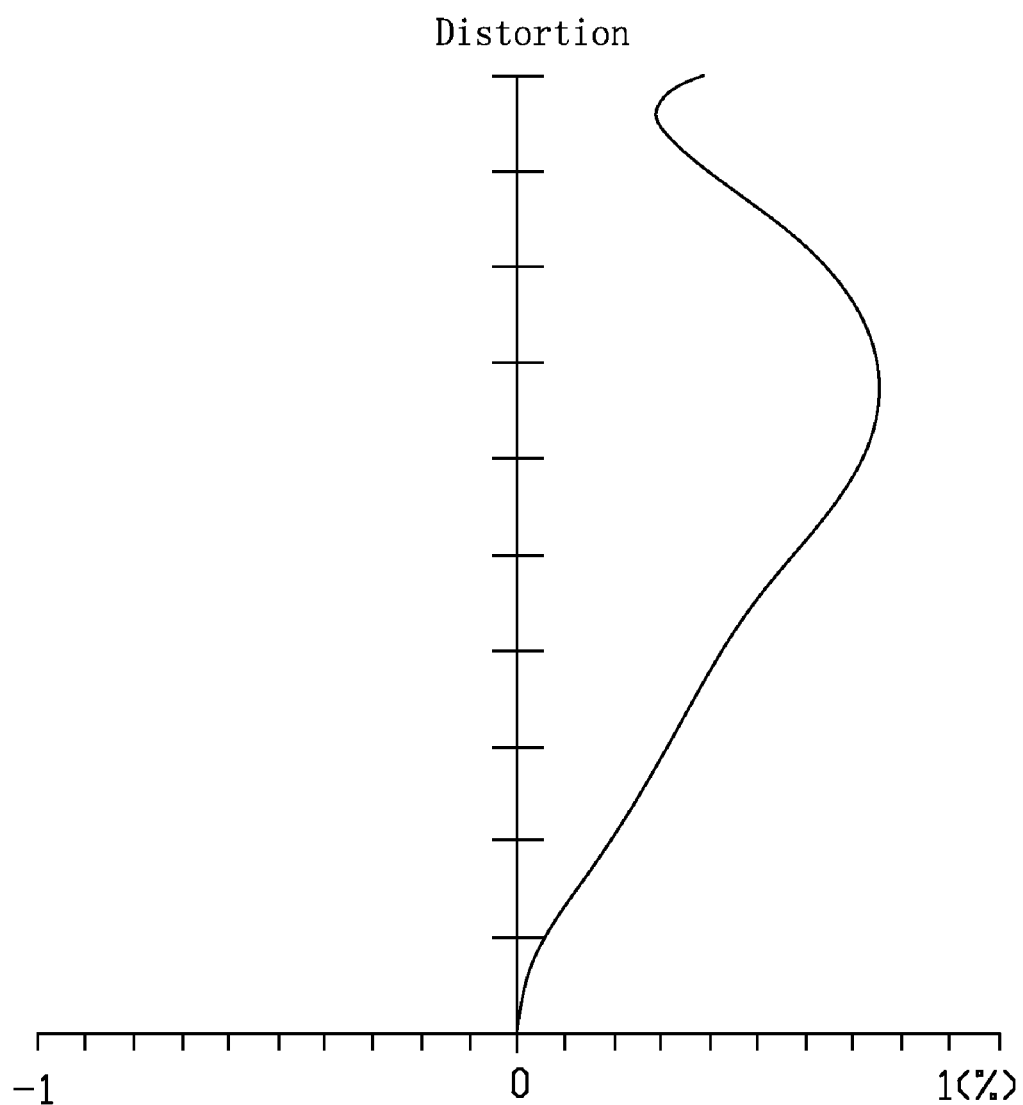

FIGS. 2 through 4 are graphs of aberrations (spherical aberration, field curvature, and distortion) of the lens system 100 of Example 1. In FIG. 2, the curves c, d, and f show spherical aberration of the lens system 100 corresponding to three types of light with wavelengths of 656.3 nm, 587.6 nm, and 435.8 nm respectively. Generally, the spherical aberration of lens system 100 is limited to a range from −0.05 mm to 0.05 mm, the field curvature of the lens system 100 is limited to a range from −0.05 mm to 0.05 mm, and the distortion of the lens system 100 is limited to a range from −1% to 1%.

EXAMPLE 2

Tables 3 and 4 show lens data of Example 2. In the table 4, A4 to A12 are aspherical coefficients.

TABLE 3

| Surface symbol | R (mm) | D (mm) | nd | V |
|---|---|---|---|---|
| 11 | 2.77 | 0.92 | 1.54 | 52 |
| 12 | 53.75 | 0.59 | | |
| 21 | −4.07 | 0.30 | 1.62 | 25 |
| 22 | 6.54 | 0.10 | | |
| 31 | 6.87 | 3.00 | 1.53 | 56 |
| 32 | −1.08 | 0.08 | | |
| 41 | 4.24 | 0.80 | 1.58 | 30 |
| 42 | 1.02 | 1.44 | | |

TABLE 4

| Surface symbol | 11 | 12 | 21 | 22 | 31 | 32 | 41 | 42 |
|---|---|---|---|---|---|---|---|---|
| A4  |  0.0074 |  0.0181 |  0.0057 | −0.0120 | −0.0372 | −0.0661 | −0.0500 | −0.0158 |
| A6  |  0.0059 | −0.0064 | −0.0619 | −0.0561 | −0.0275 |  0.0222 |  0.0121 |  0.0013 |
| A8  | −0.0046 |  0.0032 |  0.0638 |  0.0678 |  0.0328 | −0.0069 | −0.0032 | −0.0002 |
| A10 |  0.0034 | −0.0075 | −0.0547 | −0.0330 |  0.0069 |  0.0011 |  0.0005 |  1.7E-05 |
| A12 | −0.0010 |  0.0025 |  0.0093 |  0.0053 | −0.0007 | −6.5E-05 | −3.7E-05 | −1.1E-06 |

Figure 5:
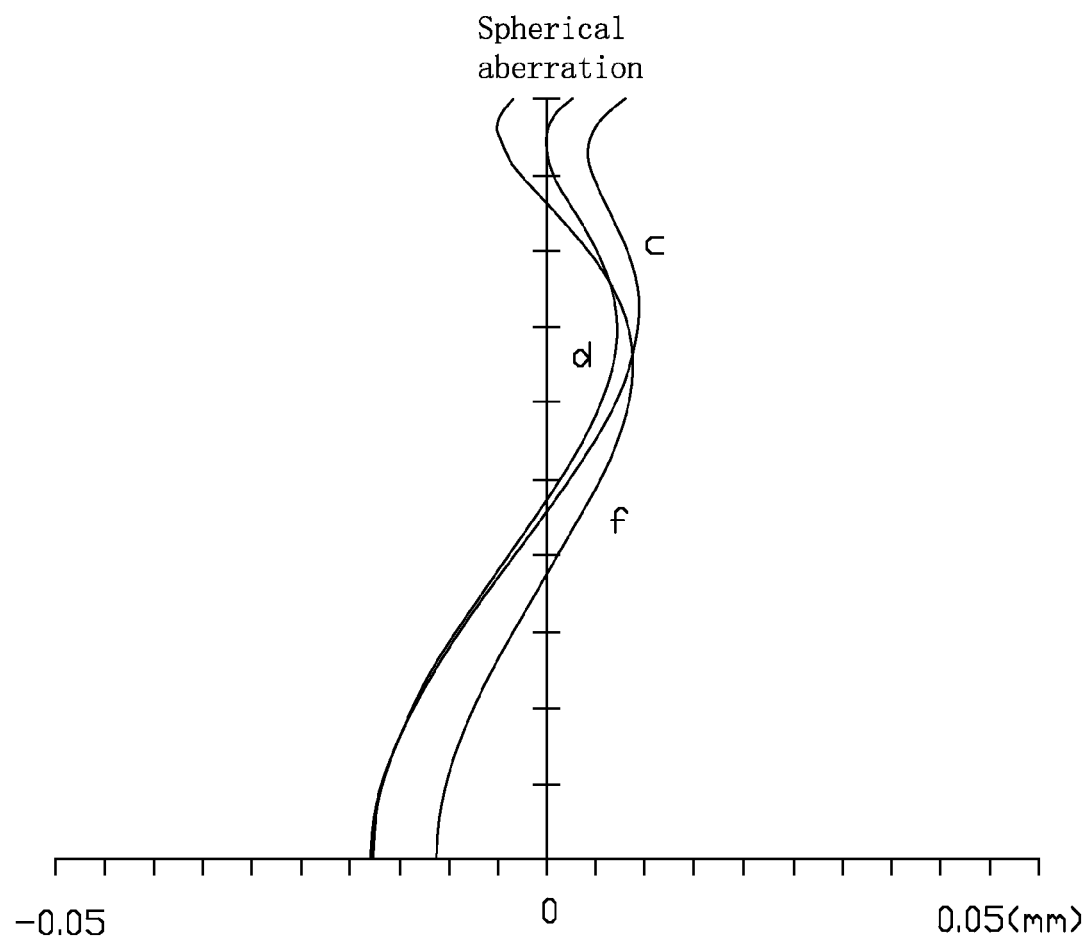
FIGS. 5 through 7 are graphs respectively showing spherical aberration, field curvature, and distortion for a lens system in accordance with a second exemplary embodiment of the present invention.
Figure 6:
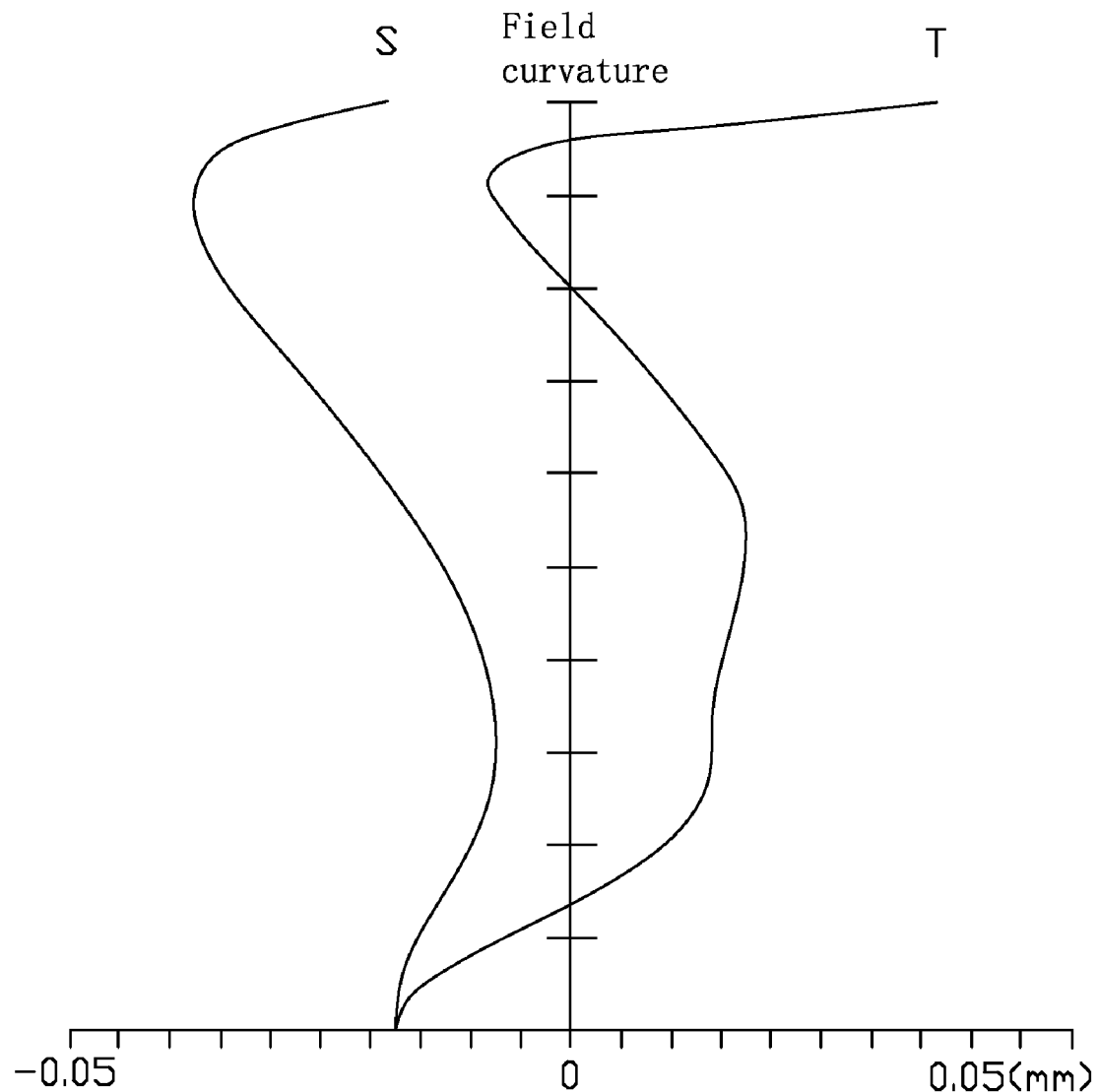
Figure 7:
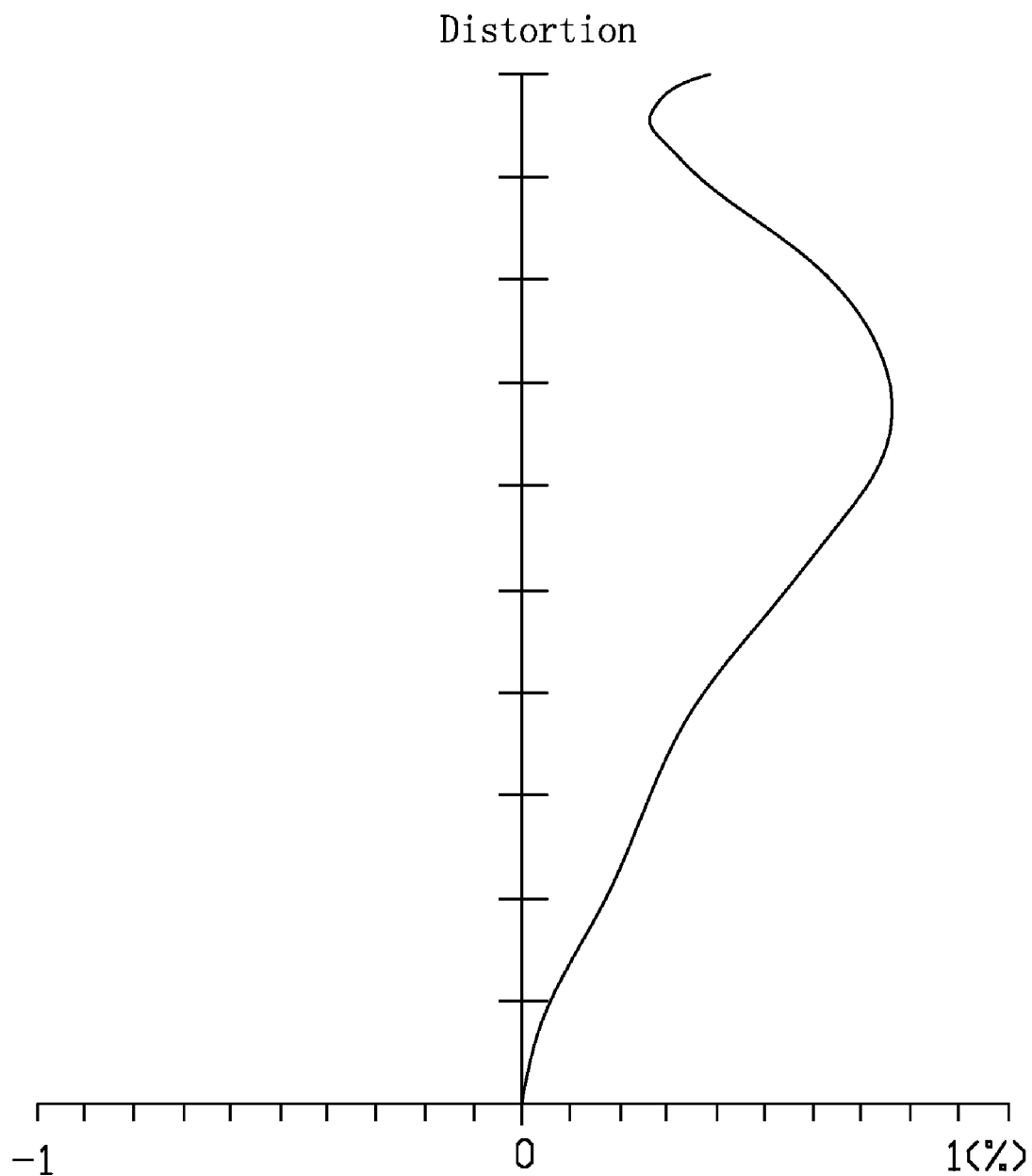

FIGS. 5 through 7 are graphs of aberrations (spherical aberration, field curvature, and distortion) of the lens system 100 of Example 2. In FIG. 5, the curve c, d, and f show spherical aberration of the lens system 100 corresponding to three types of light with wavelengths of 656.3 nm, 587.6 nm, and 435.8 nm respectively. Generally, the spherical aberration of lens system 100 is limited to a range from −0.05 mm to 0.05 mm, the field curvature of the lens system 100 is limited to a range from −0.05 mm to 0.05 mm, and the distortion of the lens system 100 is limited to a range from −1% to 1%.

As seen in the above-described examples, the distortion of the lens system 100 is limited to a range from −1% to 1% and the system 100 appropriately corrects fundamental aberrations. The light emergence angle of the lens system 100 is reduced by limiting the shape of the surface 32 of the third lens 30.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A lens system comprising, in order from the object side:
a positive refractive power first lens;
a negative refractive power second lens;
a positive refractive power third lens; and
a negative refractive power fourth lens,
wherein the lens system satisfies the following conditions:

$$D1/D2 < 1.6; \text{ and} \quad (1)$$

$$R2/F1 > 1.8, \quad (2)$$

wherein, D1 is the effective radius of a surface of the third lens facing the image side of the lens system, D2 is a distance from the top point of a surface to the optical center of the third lens, R2 is the radius of curvature of a surface of the first lens facing the image side of the lens system, and F1 is a focal length of the first lens.

2. The lens system as claimed in claim 1, wherein the following conditions are satisfied:

$$R3 < 0; \quad (3)$$

$$R7 > R8; \text{ and} \quad (4)$$

$$R7/F > 0.5, \quad (5)$$

wherein, R3 is the radius of curvature of a surface of the second lens facing the object side of the lens system, R7 is the radius of curvature of a surface of the fourth lens facing the object side of the lens system, R8 is the radius of curvature of a surface of the fourth lens facing the image side of the lens system, and F is the focal length of the lens system.

3. The lens system as claimed in claim 1, wherein the Abbe constant V1 of the first lens and V2 of the second lens satisfy the following conditions:

$$V1 > 50; \text{ and} \quad (6)$$

$$V2 < 32 \quad (7).$$

4. The lens system as claimed in claim 1, wherein the first lens is a meniscus-shaped lens with a convex surface facing the object side of the lens system.

5. The lens system as claimed in claim 1, wherein the second lens is a biconcave-shaped lens.

6. The lens system as claimed in claim 1, wherein the third lens is a biconvex-shaped lens.

7. The lens system as claimed in claim 1, wherein the fourth lens is a meniscus-shaped lens with a convex surface facing the object side of the lens system.

8. The lens system as claimed in claim 1, wherein each of the first lens, the second lens, the third lens, and the fourth surface is an aspherical lens.

* * * * *